United States Patent
Althoff et al.

(10) Patent No.: US 10,374,495 B2
(45) Date of Patent: Aug. 6, 2019

(54) METHOD FOR RELEASING THE ROTOR POLES IN AN ELECTRICAL MACHINE

(71) Applicant: VOITH PATENT GMBH, Heidenheim (DE)

(72) Inventors: Martin Althoff, Heidenheim (DE); Axel Daniel Winter, Amstetten (DE)

(73) Assignee: Voith Patent GmbH, Heidenheim (DE)

( * ) Notice: Subject to any disclaimer, the term of this patent is extended or adjusted under 35 U.S.C. 154(b) by 272 days.

(21) Appl. No.: 15/337,082

(22) Filed: Oct. 28, 2016

(65) Prior Publication Data

US 2017/0047825 A1  Feb. 16, 2017

Related U.S. Application Data

(63) Continuation of application No. PCT/EP2015/059129, filed on Apr. 28, 2015.

(30) Foreign Application Priority Data

Apr. 28, 2014  (DE) .................. 10 2014 207 915

(51) Int. Cl.
*H02K 15/02* (2006.01)
*H02K 15/00* (2006.01)

(52) U.S. Cl.
CPC ....... *H02K 15/0006* (2013.01); *H02K 15/022* (2013.01); *Y10T 29/49012* (2015.01); *Y10T 29/49718* (2015.01); *Y10T 29/49721* (2015.01)

(58) Field of Classification Search
CPC .... H02K 15/0006; H02K 15/00; H02K 1/148; H02K 2203/12; H02K 3/522; Y10T 29/49009; Y10T 29/49073; Y10T 29/49078; Y10T 29/49012; Y10T 29/49718; Y10T 29/49721; B65F 1/068; B65F 1/14
USPC ............ 310/215; 254/156; 335/297; 29/596, 29/606, 609, 598, 402.01, 402.03, 402.06
See application file for complete search history.

(56) References Cited

U.S. PATENT DOCUMENTS 3,559,375 A  2/1971  Bidard
4,518,151 A  5/1985  Dill, Jr.

FOREIGN PATENT DOCUMENTS

| DE | 950940 C | 10/1956 |
|---|---|---|
| DE | 1810501 U | 4/1960 |
| DE | 19520361 A1 | 12/1996 |
| JP | 2013146161 A | 7/2013 |

*Primary Examiner* — Thiem D Phan
(74) *Attorney, Agent, or Firm* — Laurence A. Greenberg; Werner H. Stemer; Ralph E. Locher

(57) ABSTRACT

A method releases rotor poles of a large electrical machine from the rotor hub, which in the fitted state is located within the stator. In one method step, at least one device is introduced into the air gap between the sector and a rotor pole to be released. The device has a carrier plate and at least one cushion that can be filled with gas and is attached to the carrier plate. In a following method step, the cushions belonging to the device are filled with gas under pressure, the pressure being successively increased until the pole to be released has come away, and in that, in a following method step, the at least one device is removed from the air gap. In a further step, the released pole is pulled out of the rotor hub.

4 Claims, 3 Drawing Sheets

METHOD FOR RELEASING THE ROTOR POLES IN AN ELECTRICAL MACHINE

CROSS-REFERENCE TO RELATED APPLICATION

This is a continuation application, under 35 U.S.C. § 120, of copending international application No. PCT/EP2015/059129, filed Apr. 28, 2015, which designated the United States; this application also claims the priority, under 35 U.S.C. § 119, of German patent application No. DE 10 2014 207 915.2, filed Apr. 28, 2014; the prior applications are herewith incorporated by reference in their entireties.

BACKGROUND OF THE INVENTION

Field of the Invention

The present invention relates to a device and a method for removing the rotor poles in a large electrical machine, as is used for example in hydroelectric power plants.

For servicing and maintaining or for reconditioning or modernizing a large electrical machine, it may be necessary to remove the rotor poles. In order to keep the effort and costs involved in this measure down as much as possible, the poles are generally pulled out of the rotor hub in an axial direction, the rotor hub remaining in the electrical machine. It occasionally happens that the removal of the rotor pole presents unexpected difficulties. The object of the present invention is to overcome these difficulties in a way which on the one hand does not cause any damage to the electrical machine and on the other hand is as inexpensive as possible.

The rotor poles are usually mounted on the rotor hub with the aid of dovetail or hammerhead connections. During operation, the poles are subjected to the centrifugal force that acts in a radial direction. The inventors have realized that the difficulties arise because the poles become twisted in the mounting in such a way that, to release this unwanted connection, it is necessary to exert on the poles a force that has to be directed in the negative radial direction, i.e. toward the rotor axis. Only once the poles have been released from the unwanted connection to the rotor hub by the action of the force directed in this way can they be pulled out in an axial direction without further difficulties. However, such a force cannot readily be exerted on the poles, since a rotor pole in the fitted state is only accessible to a restricted extent. Generally, only one or both end faces of the pole is freely accessible. A force in the negative radial direction can thus initially only act on these locations. Experience shows that this procedure is often insufficient to release the pole from the unwanted connection to the hub over its entire length. The inventors have realized that it is necessary to apply the releasing force homogeneously over the entire length of the pole.

SUMMARY OF THE INVENTION

It is accordingly an object of the invention to provide a method for releasing the rotor poles in an electrical machine that overcomes the above-mentioned disadvantages of the prior methods of this general type.

With the foregoing and other objects in view there is provided, in accordance with the invention, a method for releasing rotor poles of a large electrical machine from a rotor hub. The rotor hub in a fitted state is disposed within a stator. The method includes introducing at least one device into an air gap between the stator and a rotor pole to be released. The device has a carrier plate and at least one cushion that can be filled with gas and the cushion being attached to the carrier plate. The cushion belonging to the device is filled with the gas under pressure, the pressure being successively increased until the rotor pole to be released has come away. The at least one device is removed from the air gap and a released pole is pulled out from the rotor hub.

In accordance with an added feature of the invention, the carrier plate is a fabric-base laminate panel.

In accordance with an additional feature of the invention, the at least one cushion that can be filled with gas is attached to the carrier plate with an aid of hook-and-loop fasteners or adhesive strips.

In accordance with a further mode of the invention, there is the step of filling the least one cushion with gas with the aid of a tube, the tube being attached to the carrier plate. The at least one tube for filling the at least one cushion is attached to the carrier plate with the aid of adhesive strips.

In accordance with another mode of the invention, there is the step of using compressed air as the gas.

In accordance with a concomitant mode of the invention, the at least one device is one of a plurality of devices and an even number of the devices are respectively used simultaneously, namely two of the devices in each case being used at opposite rotor poles.

Other features which are considered as characteristic for the invention are set forth in the appended claims.

Although the invention is illustrated and described herein as embodied in a method for releasing the rotor poles in an electrical machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
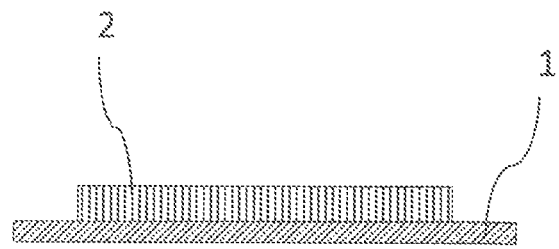
FIG. 1 is a diagrammatic, plan view of a device according to the invention.
Figure 2:
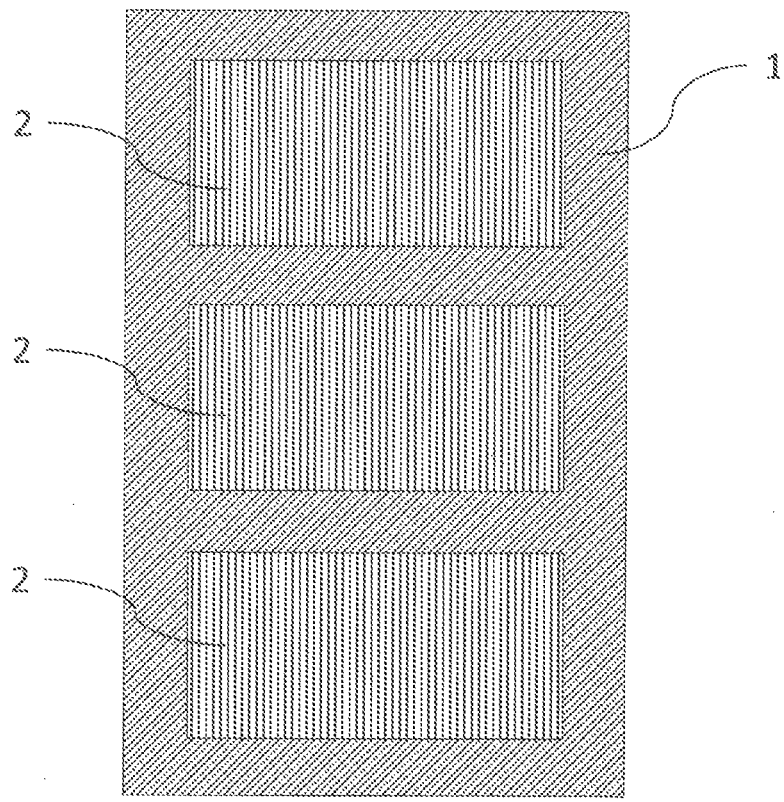
FIG. 2 is an front view showing the device.

Referring now to the figures of the drawings in detail and first, particularly to FIG. 1 thereof, there is shown in a schematic form a device according to the invention for removing rotor poles. Here, a carrier plate is denoted by 1 and a cushion to be filled with gas is denoted by 2. In FIG. 2, the device according to the invention can be seen from the front. In the arrangement shown, three cushions 2 to be filled with gas are located one on top of the other on the carrier plate 1. However, depending on the pole geometry, any number of cushions may be provided on a carrier plate. The device according to the invention for removing the rotor poles is in this case used in the following way: the carrier plate is introduced together with the cushions attached to it, which are not filled with gas, into the air gap between the generator stator and the rotor poles. The air gap is generally only a few centimeters wide. When the cushions are filled with gas, they expand in such a way that they exert a force both on the stator and on the rotor pole to be released. These forces increase proportionately with increasing gas pressure inside the cushions. The force that acts on the rotor pole is the force that is necessary for releasing the pole. In order that this force can be distributed homogeneously over the entire length of the pole, the cushions must be correspondingly introduced into the air gap in a homogeneously distributed manner over the entire length of the pole. This is achieved with the aid of the carrier plate, on which the cushions are provided in a correspondingly distributed manner. The carrier plate in this case provides the structural strength that is required to bring the air cushions to the desired location in the air gap. It has been found to be expedient that the carrier plate is at least approximately as wide and as high as a rotor pole to be released. It has likewise been found to be expedient that the cushions are attached to the carrier plate with the aid of hook-and-loop fasteners. Another expedient and inexpensive way of attaching the cushions to the carrier plate can be realized with the aid of adhesive strips.

The filling of the cushions with gas under pressure takes place with the aid of tubes. These tubes are not represented in the figures. Compressed air, which is generally easily available, comes into consideration in particular as the gas. However, other gases may also be used. It has been found to be expedient to increase the pressure of the gas in the cushions in stages. In order that the tubes do not unnecessarily hinder the introduction of the device into the air gap, it has been found to be expedient that the tubes are attached to the carrier plate for example with adhesive strips.

The device can in principle be inserted into the air gap in two different alignments. In the first alignment, the carrier plate faces in the direction of the stator, while the air cushions come to lie in the direction of the rotor pole. In the other alignment, the carrier plate faces in the direction of the rotor pole and the cushions come to lie in the direction of the stator. In principle, both alignments can be used successfully. However, it has been found that the first alignment variant (carrier plate faces in the direction of the stator) is particularly expedient, since in this alignment the carrier plate protects the stator from possible damage. On the inner side of the stator are the winding slots and the winding bars placed therein. The insulation of the winding bars is particularly sensitive, and a pressure exerted on it could lead to the insulation becoming damaged, and consequently to short-circuits. If the carrier plate lies in the direction of the stator, the carrier plate is supported on the teeth of the laminated stator core that lie between the winding slots and are less sensitive. Protected by the strength of the carrier plate, the winding bars lying in the slots are not subjected to any harmful pressure. If, on the other hand, the cushions were to lie on the stator side, because of their easy deformability they would push themselves into the slots and thereby also exert a harmful pressure on the winding bars lying therein. If the slots are protected by closure devices, which protrude beyond the teeth of the laminated stator core in the direction of the rotor, spacers can also be additionally provided on the teeth, so that the carrier plate is supported on the teeth by way of these spacers and thus cannot press onto the closure device.

Fiber-reinforced plastics, for example so-called fabric-base laminate panels, have been found to be particularly favorable as the material for the carrier plate, because they have a high strength with a small thickness. Also, the use of a plastic ensures that damage to the stator due to instances of impact when the device is introduced into the air gap can be avoided. This is a result of the low hardness of the plastic in comparison with the stator sheets.

Figure 3:
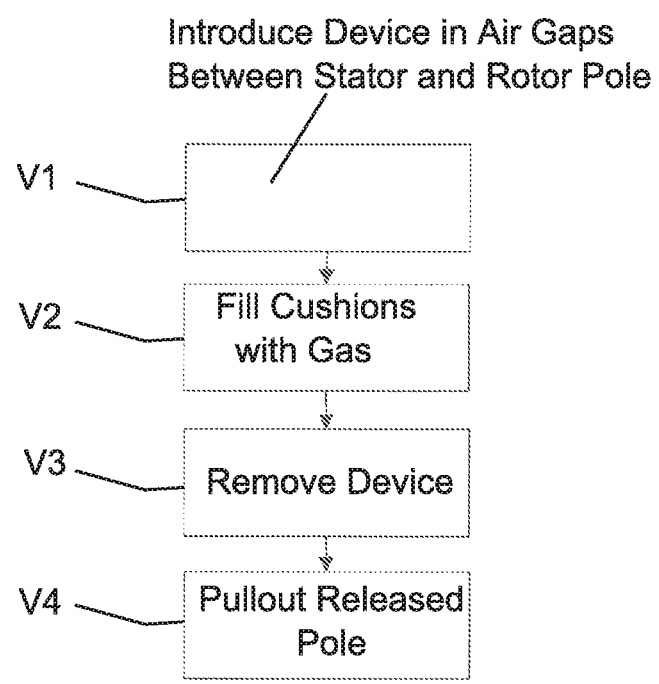
FIG. 3 is a flow chart for illustrating a method according to the invention.

In FIG. 3, the sequence of the method according to the invention is schematically represented. In the method step denoted by V1, at least one device according to the invention is introduced into the air gap between the stator and a rotor pole to be released. In the method step denoted by V2, the cushions of the device according to the invention are filled with gas under pressure, the pressure of the gas being successively increased until the rotor pole to be released has come away from the rotor hub. In the method step denoted by V3, the device according to the invention is removed from the air gap and, in the method step denoted by V4, the released pole is pulled out of the hub.

Steps V1 to V4 are repeated until all of the poles have been removed. Equally, only steps V1 to V3 could be repeated until all of the rotor poles are released, and then step V4 is repeated as often as it takes until all of the rotor poles are removed. It is also conceivable that steps V3 and V4 are performed in the opposite sequence.

It has been found to be particularly expedient if an even number of devices according to the invention are used simultaneously in steps V1, V2 and V3. In this case, two devices according to the invention are always introduced at opposite poles and the associated cushions are filled with gas under pressure. In this way, the forces for releasing the poles are introduced symmetrically in relation to the rotor shaft, so that the forces cancel one another out with respect to the rotor shaft. As a result, the bearings of the rotor are not unduly stressed.

Figure 4:
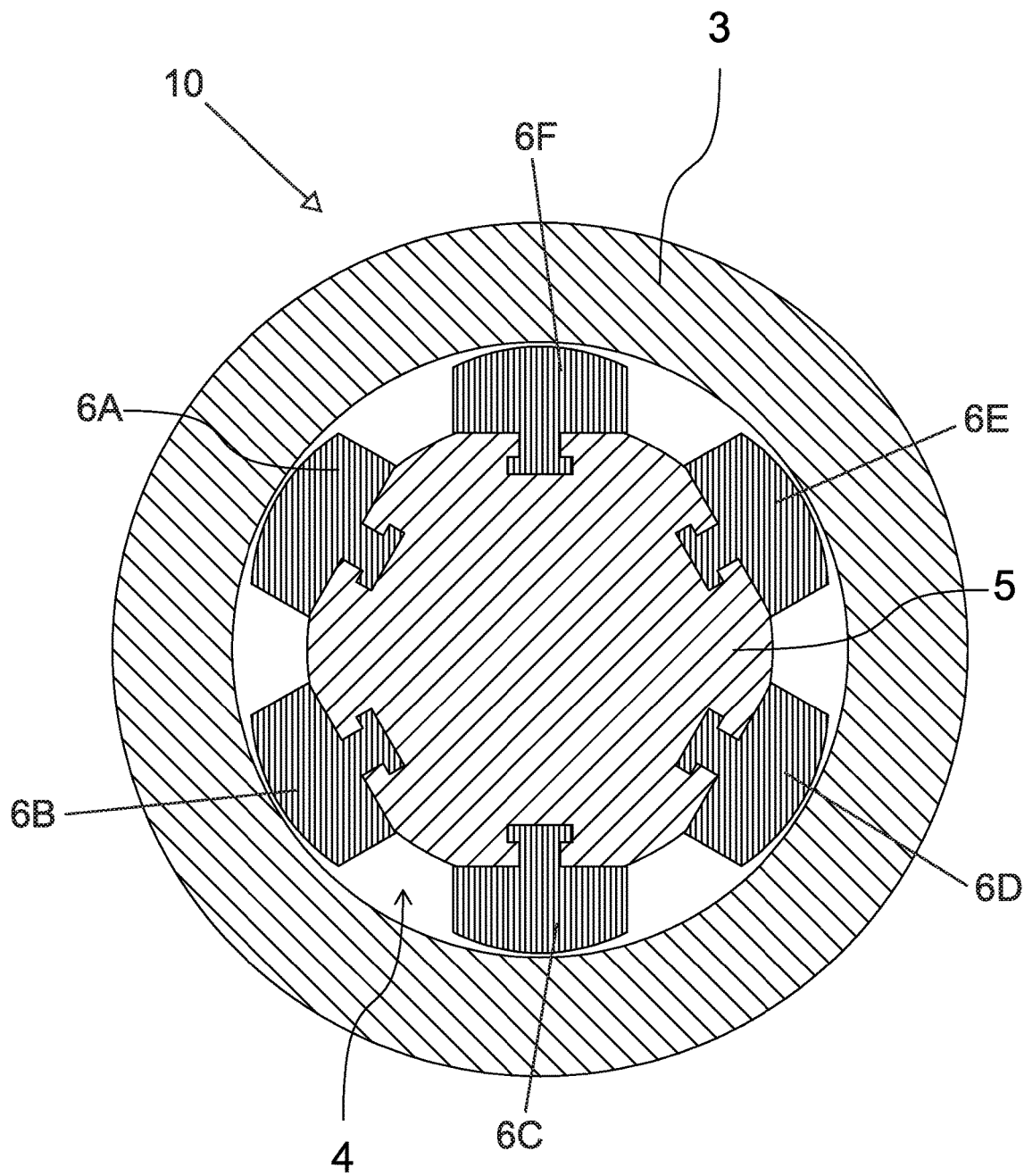
FIG. 4 is a diagrammatic view of an exemplary electrical machine.

FIG. 4 is a diagrammatic view of an exemplary electrical machine 10. The electrical machine 10 includes a stator 3, a rotor 4, a rotor hub 5, and a plurality of rotor poles 6a-6f.

The invention claimed is:

1. A method for releasing rotor poles of a large electrical machine from a rotor hub, the rotor hub being in a fitted state, disposed within a stator, which comprises the steps of:
   introducing at least one device into an air gap between the stator and a rotor pole to be released, wherein the device has a carrier plate and at least one cushion that can be filled with gas and the cushion is attached to the carrier plate;
   filling the cushion belonging to the device with the gas under pressure, the pressure being successively increased until the rotor pole to be released has come away;
   removing the at least one device from the air gap; and
   pulling out a released pole from the rotor hub.

2. The method according to claim 1, wherein the carrier plate is a fabric-base laminate panel.

3. The method according to claim 1, which further comprises using compressed air as the gas.

4. The method according to claim 1, wherein the at least one device includes an additional device used simultaneously with the device and located in an air gap between the stator and a further rotor pole located opposite the rotor pole to be released.

* * * * *